Patented Jan. 7, 1947

2,414,058

UNITED STATES PATENT OFFICE 2,414,058

METHOD OF MAKING LEAD ALKYLS

Howard William Pearsall, Detroit, Mich., assignor to Ethyl Corporation, New York, N. Y., a corporation of Delaware No Drawing. Application May 10, 1944, Serial No. 534,985

6 Claims. (Cl. 260—437)

This invention relates to methods for manufacturing alkyl compounds of lead having only ethyl or methyl radicals, or both. These are commonly termed tetraalkyllead compounds containing from four to eight carbon atoms. The only commercial process employed in making tetraethyllead follows the method described in Kraus and Callis Patent No. 1,697,245, issued January 1, 1929. In this process the alloy NaPb reacts with ethyl chloride without the use of a catalyst to produce a yield of tetraethyllead of about 87% to 92% based on the sodium content of the alloy. In this process of each four parts of lead placed in the autoclave about one part is used in forming tetraethyllead, and three parts are left as metallic lead in the autoclave.

Attempts have been made to use other sodium-lead alloys so as to convert more of the lead content of the autoclave into tetraethyllead and leave less lead in the residue. An example of these attempts is described in Calingaert Patent No. 1,622,233, issued March 27, 1927. In this process the alloy Na₂Pb is used with ethyl bromide. If this process had been as successful on a manufacturing basis as the NaPb process described above it would be more practical because for the same quantity of tetraethyllead made only about one third as much lead remains as residue as in the NaPb process. However, on a commercial scale the Na₂Pb process was less efficient than the NaPb process.

A sodium-lead alloy process for making mixed methyl-ethyl lead compounds and for making tetramethyllead is described in Calingaert and Beatty Patent No. 2,270,109, issued January 13, 1942.

The best sodium-lead alloy to use would be Na₄Pb which, theoretically, would not leave any lead in the residue. This does not show promise.

I have discovered a catalyzed direct reaction between lead and ethyl chloride forming tetraethyl lead and lead chloride. In this reaction, iodine or iodides form the best catalysts. If iodine is used it may react directly or indirectly to form lead iodide or ethyl iodide which are the best catalysts thus far discovered.

The extent and character of the lead surface in large measure determines the rate of the reaction. The finer the lead particles with a resultant increase in lead surface and the freer the surface from oxidation, the more efficient the reaction. Finely divided lead produced by decomposition of tetraethyllead in a non-oxidizing atmosphere, such as ethyl chloride, is more reactive than mechanically divided lead. Where the reactivity of the lead is insufficient to produce appreciable yields in the presence of an iodine catalyst the yields may be increased by the use of small amounts of aluminum chloride as, for example, five percent by weight of the lead.

However, I have discovered that the lead left in the residue from a sodium alloy reaction in making a lead alkyl provides the best form of lead for the direct reaction with ethyl or methyl chloride. The sodium reaction leaves the lead in the residue with a clean surface, finely-divided and probably also of a porous or spongy character which increases the rate of reaction. Using this residue in the autoclave also has the advantage that the autoclave is already charged with lead and ethyl or methyl chloride so that all that is required is to add the catalyst and more chloride.

I have also discovered that it is not necessary to wait until the initial sodium-lead reaction has gone to completion before starting the direct reaction between lead and the chloride and obtain a high yield.

While my process may be used with mechanically-divided or other forms of finely-divided lead, it probably has its greatest utility either following a sodium-lead reaction or in conjunction with that reaction.

In carrying out my process I preferably first make a sodium-lead reaction such as one of those described above and vacuum distill, from the autoclave, the lead alkyl thus produced. Removing the lead alkyl avoids probable decomposition of part of the lead alkyl at the temperatures of the next reaction. The finely-divided lead residue is left in the autoclave.

The chloride now fed into the autoclave depends on the product desired, ethyl chloride being used to make tetraethyllead, methyl chloride to make tetramethyllead and a mixture of methyl chloride and ethyl chloride to make an equilibrium mixture of the type described in the Calingaert and Beatty patent. Lead iodide is used here as a catalyst because it causes the reaction to take place at commercially attractive rates. In making an equilibrium mixture the autoclave is given a charge of reactants in the proportion of 2.0 moles of ethyl chloride, 1.8 moles of methyl chloride and 0.015 mole of $PbI_2$. The reaction mass is then heated to 122° C. for five hours when the autoclave is vented and the product separated by steam distillation.

The time and temperature of this reaction may be varied but it has been found preferable to stop the reaction before all the lead is used up because of rapid decomposition of the lead alkyl at the temperature of the reaction. Good rates of reaction have been obtained at temperatures between 100° C. and 130° C., the rate of reaction increasing with increase of temperature, but I have found that temperatures above 130° C. may produce such a rapid decomposition of the product that the increased rate of reaction does not produce a corresponding high yield. The time may be varied depending on the temperature at which the reaction is carried out.

Good yields of tetramethyllead have been obtained by using in proportion 2.5 moles of methyl chloride and 0.025 moles of $PbI_2$ and for tetraethyllead 1.9 moles of ethyl chloride and 0.015 mole of $PbI_2$. The proportions are not critical.

$I_2$ and $PbI_2$ are the best catalysts. The following iodides produce a high rate of reaction: NaI, KI, $CH_3I$, $C_2H_5I$, $C_6H_5I$, $HgI_2$ and $Cu_2I_2$. Other iodides in their order of decreasing value as catalysts are, $CdI_2$, $CeI_3$, $BiI_3$, $CsI$, $ZnI_2$, $AsI_5$, $SbI_5$ and n-PrI. It appears that iodine is the active catalyst and that the element or radical with which it is combined is merely a carrier for it. The effectiveness of the compound depends on the nature of the carrier. For these reasons I. call all of these iodine catalysts.

The ethyl and methyl bromides may be used in place of the corresponding chlorides but the yields obtained are lower and the chlorides are, therefore, more attractive commercially.

I have discovered that the direct reaction between the lead and an alkyl halide may proceed before the sodium-lead alloy reaction has gone to completion. This is attractive particularly when the same product is to be produced from the two reactions. After the sodium-lead reaction has proceeded so that there is free lead in the autoclave the direct reaction between lead and the alkyl halide will proceed if the catalyst is present. However, the rate of reaction is small at the temperature, 70° C., employed in the NaPb reaction. The temperature may be maintained at about 70° C. to complete the NaPb reaction and later raised to 100° C.-130° C. to complete the direct reaction, or it may be raised immediately so that the two reactions take place at a high rate at the same time.

The time of the reaction depends on the rate of the reaction and the rate of decomposition which may be produced with the concentration of lead alkyl in the autoclave and the temperature employed.

I claim:

1. The method of making tetraalkyl compounds of lead which comprises reacting finely-divided lead having a non-oxidized surface with at least one compound taken from the group consisting of ethyl chloride, methyl chloride, ethyl bromide and methyl bromide in the presence of an iodine catalyst.

2. The method of making tetraalkyl compounds of lead which comprises reacting finely-divided lead having a non-oxidized surface with at least one compound taken from the group ethyl chloride and methyl chloride in the presence of a catalyst taken from the group consisting of iodine, lead iodide and ethyl iodide at a temperature between 100° C. and 130° C. inclusive.

3. The method of making tetraethyllead which comprises reacting a lead residue, from a sodium-lead reaction for producing lead alkyls, with ethyl chloride in the presence of an iodine catalyst.

4. In the method of making tetraalkyl compounds of lead by producing a sodium-lead reaction with an alkyl halide containing from four to eight carbon atoms thereby forming a lead residue, the step which comprises producing a direct reaction between the lead in the residue and such an alkyl halide with an iodine catalyst while the sodium-lead reaction is proceeding.

5. In the method of making tetraalkyllead by producing an NaPb reaction with ethyl chloride thereby forming a lead residue, the step which comprises producing a direct reaction between the lead in the residue and ethyl chloride with a catalyst taken from the group iodine, lead iodide and ethyl iodide while the NaPb reaction is proceeding.

6. The method of making tetraalkyl compounds of lead which comprises reacting finely-divided lead having a non-oxidized surface with at least one compound taken from the group consisting of ethyl chloride, methyl chloride, ethyl bromide and methyl bromide in the presence of an iodine catalyst and aluminum chloride.

HOWARD WILLIAM PEARSALL.